United States Patent
Itkin et al.

(10) Patent No.: US 11,977,180 B2
(45) Date of Patent: May 7, 2024

(54) RADAR SYSTEM WITH MONITORING FUNCTION

(71) Applicant: Infineon Technologies AG, Neubiberg (DE)

(72) Inventors: Grigory Itkin, Munich (DE); Stefan Herzinger, Sauerlach (DE)

(73) Assignee: Infineon Technologies AG, Neubiberg (DE)

( * ) Notice: Subject to any disclaimer, the term of this patent is extended or adjusted under 35 U.S.C. 154(b) by 288 days.

(21) Appl. No.: 17/360,082

(22) Filed: Jun. 28, 2021

(65) Prior Publication Data

US 2022/0003838 A1    Jan. 6, 2022

(30) Foreign Application Priority Data

Jul. 6, 2020    (DE) .......................... 102020117748.8

(51) Int. Cl.
*G01S 7/40*    (2006.01)

(52) U.S. Cl.
CPC .............. *G01S 7/40* (2013.01); *G01S 7/4021* (2013.01)

(58) Field of Classification Search
CPC ......... G01S 7/40; G01S 7/4021; G01S 7/4056
See application file for complete search history.

(56) References Cited

U.S. PATENT DOCUMENTS

| | | | |
|---|---|---|---|
| 8,816,902 B2 | 8/2014 | Itoh | |
| 9,331,797 B2 | 5/2016 | Kordik et al. | |
| 10,673,544 B2 | 6/2020 | Christoffers et al. | |
| 10,801,878 B2 | 10/2020 | Schultheiss et al. | |
| 2016/0087734 A1* | 3/2016 | Kordik | H04B 17/0085 455/67.14 |
| 2017/0353876 A1* | 12/2017 | Starzer | H04B 1/16 |
| 2018/0062768 A1* | 3/2018 | Frank | H04B 15/005 |
| 2018/0172801 A1* | 6/2018 | Schrattenecker | G01S 7/352 |
| 2019/0271764 A1 | 9/2019 | Onic et al. | |

FOREIGN PATENT DOCUMENTS

| | | |
|---|---|---|
| DE | 102012208280 A1 | 11/2012 |
| DE | 102015115017 A1 | 3/2016 |
| DE | 102016211764 A1 | 1/2018 |
| DE | 102018130088 A1 | 6/2019 |
| DE | 102018104729 A1 | 9/2019 |

* cited by examiner

*Primary Examiner* — Timothy X Pham

(74) *Attorney, Agent, or Firm* — Harrity & Harrity, LLP

(57) ABSTRACT

A radar system includes a signal generator configured to generate an RF signal; a modulator configured to generate an RF test signal by modulating the RF signal with a test signal; a transmitting channel configured to generate an RF output signal based on the RF signal; and a receiving channel configured to receive an antenna signal and the RF test signal and down-convert a superposition of the two signals to baseband by means of a mixer in order to obtain a baseband signal. The radar system further includes an analog-to-digital converter configured to generate a digital radar signal based on the baseband signal, and a computing unit configured to filter the digital radar signal by means of a digital filter, wherein the filter characteristic of the digital filter has a pass band, a transition band, and a stop band. The test signal has a frequency in the transition band.

20 Claims, 3 Drawing Sheets

RADAR SYSTEM WITH MONITORING FUNCTION

RELATED APPLICATION

This application claims priority to German Patent Application No. 102020117748.8, filed on Jul. 6, 2020, which is incorporated herein by reference in its entirety.

FIELD

The present description relates to the field of radar sensors, in particular a radar system with monitoring function for checking one or more receiving channels.

BACKGROUND

Radar sensors are used in a multiplicity of applications for detecting objects, wherein the detecting usually comprises measuring distances and speeds and also azimuth angles (Direction of Arrival, DoA) of the detected objects. In the automotive field, in particular, there is an increasing need for radar sensors which can be used, inter alia, in driving assistance systems (Advanced driver assistance systems, ADAS), such as e.g. in cruise control (ACC, Adaptive Cruise Control, or Radar Cruise Control) systems. Such systems can automatically adapt the speed of an automobile in order thus to maintain a safe distance from other automobiles ahead (and also other objects and pedestrians). Further applications in the automotive field are e.g. blind spot detection, lane change assist and the like. In the field of autonomous driving, radar sensors and systems comprising a plurality of sensors will play an important part for the control of autonomous vehicles.

Radar applications used in automobiles are the subject of various standards concerning road traffic safety, for example the functional safety standard ISO 26262, entitled "Road Vehicles-Functional Safety". In order to ensure the functional safety of a radar sensor, it is important to know whether the current state of the radar sensor permits a reliable distance and speed measurement. However, reliability may also be a topic in other applications. For this reason, radar sensors have been developed that are able to carry out various types of self-tests.

The object established by the various example embodiments disclosed herein is that of providing a radar system having improved self-test capabilities.

SUMMARY

A radar system with monitoring function is described. In accordance with one exemplary embodiment, the radar system includes a signal generator configured to generate an RF signal; a modulator configured to generate an RF test signal by modulating the RF signal with a test signal; a transmitting channel configured to generate an RF output signal based on the RF signal; and a receiving channel configured to receive an antenna signal and the RF test signal and to down-convert a superposition of the two to baseband by means of a mixer in order to obtain a baseband signal. The radar system further includes an analog-to-digital converter configured to generate a digital radar signal based on the baseband signal, and also a computing unit configured to filter the digital radar signal by means of a digital filter, wherein the filter characteristic of the digital filter has a pass band, a transition band and a stop band. The test signal has a frequency in the transition band.

In accordance with a further exemplary embodiment, the radar system includes a signal generator configured to generate an RF signal; a modulator configured to generate an RF test signal by modulating the RF signal with a test signal; a transmitting channel configured to generate an RF output signal based on the RF signal; and a receiving channel configured to receive an antenna signal and the RF test signal and to down-convert a superposition of the two to baseband by means of a mixer in order to obtain a baseband signal. The radar system further includes an analog-to-digital converter configured to generate a digital radar signal based on the baseband signal, and also a computing unit configured to detect one or more radar targets based on the digital radar signal, wherein the test signal has a frequency that lies in a frequency range that is not used for the detection of the radar target or radar targets.

In accordance with a further exemplary embodiment, the radar system includes a signal generator configured to generate an RF signal; a modulator configured to generate an RF test signal by modulating the RF signal with a test signal; a transmitting channel configured to generate an RF output signal based on the RF signal; and a receiving channel configured to receive an antenna signal and the RF test signal and to down-convert a superposition of the two to baseband by means of a mixer in order to obtain a baseband signal. The radar system further includes an analog-to-digital converter configured to generate a digital radar signal with a first sample rate based on the baseband signal by means of sampling with a sampling frequency and quantization. The radar system further includes a digital signal processing chain configured to receive the digital radar signal and to decimate the latter to a second sample rate (output rate), wherein a Nyquist frequency is assignable to the second sample rate and wherein the test signal has a frequency that is less than the Nyquist frequency and greater than 0.8 times the Nyquist frequency.

A method for a radar system is furthermore described. In accordance with one exemplary embodiment, the method includes generating an RF signal by means of a signal generator; generating an RF test signal by modulating the RF signal with a test signal; generating an RF output signal based on the RF signal and outputting the RF output signal at the output of a transmitting channel (TX1); receiving an antenna signal at the input of a receiving channel and down-converting a superposition of antenna signal and RF test signal to baseband by means of a mixer in order to obtain a baseband signal. The method further includes generating a digital radar signal based on the baseband signal and digital processing of the digital radar signal. The digital processing includes a digital filtering with a filter characteristic that has a pass band, a transition band and a stop band. In this case, the test signal has a frequency that lies in the transition band.

BRIEF DESCRIPTION OF THE DRAWINGS

Exemplary embodiments are explained in greater detail below with reference to figures. The illustrations are not necessarily true to scale and the exemplary embodiments are not restricted only to the aspects illustrated. Rather, importance is attached to illustrating the principles underlying the exemplary embodiments. In the figures.

DETAILED DESCRIPTION

Figure 1:
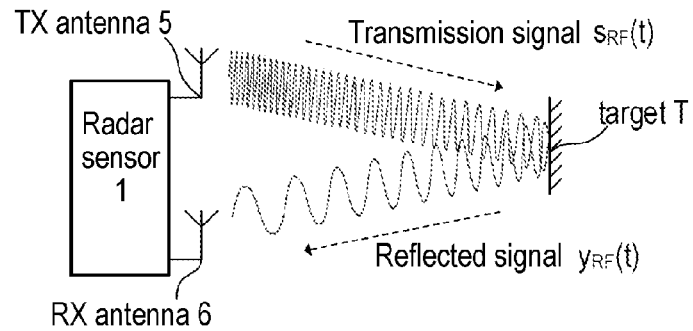
FIG. 1 is a schematic diagram for illustrating the functional principle of an FMCW radar system for distance and/or speed measurement.

FIG. 1 illustrates the application of an FMCW radar system as sensor for the detection (comprising the measurement of distances and speeds and optionally DoA) of objects, which are usually referred to as radar targets. In the present example, the radar device 1 comprises separate transmitting (TX) and receiving (RX) antennas 5 and 6 respectively (bistatic or pseudo-monostatic radar configuration). It should be noted, however, that one antenna can also be used, which serves simultaneously as transmitting antenna and as receiving antenna (monostatic radar configuration). The transmitting antenna 5 emits an RF signal $s_{RF}(t)$, which is frequency-modulated for example with a linear chirp signal (periodic, linear frequency ramp). The emitted signal $s_{RF}(t)$ is backscattered at the radar target T and the backscattered (reflected) signal $y_{RF}(t)$ is received by the receiving antenna 6. FIG. 1 shows a simplified example; in practice, radar sensors are systems comprising a plurality of transmitting (TX) and receiving (RX) channels, and the RF signal $s_{RF}(t)$ includes a sequence of chirps.

Figure 2:
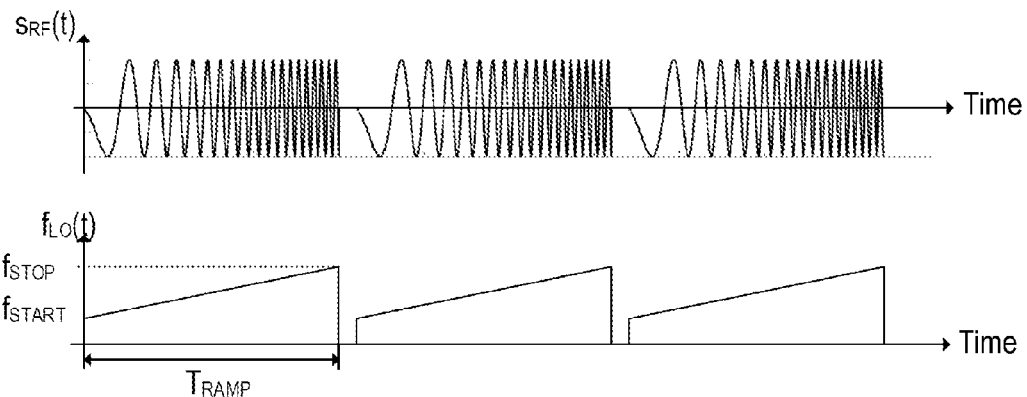
FIG. 2 comprises two timing diagrams for illustrating the frequency modulation of the RF signal generated by the FMCW system.

FIG. 2 illustrates by way of example the abovementioned frequency modulation of the signal $s_{RF}(t)$. As illustrated in FIG. 2, the signal $s_{RF}(t)$ is composed of a multiplicity of "chirps", that is to say that the signal $s_{RF}(t)$ comprises a sequence of sinusoidal signal profiles (waveforms) having a rising (up-chirp) or falling (down-chirp) frequency (see upper diagram in FIG. 2). In the present example, the instantaneous frequency $f_{LO}(t)$ of a chirp beginning at a start frequency $f_{START}$ rises linearly within a time period $T_{RAMP}$ to a stop frequency $f_{STOP}$ (see lower diagram in FIG. 2). Such chirps are also referred to as linear frequency ramps. FIG. 2 illustrates a sequence with three identical linear frequency ramps. It should be noted, however, that the parameters $f_{START}$, $f_{STOP}$, $T_{RAMP}$ and also the pauses between the individual frequency ramps can vary. The frequency variation also need not necessarily be linear. Other modulation techniques can also be used as an alternative to a frequency modulation. Other types of modulation such as e.g. PMCW (Phase-Modulated Continuous Wave) can also be used. The exemplary embodiments described here are not restricted to FMCW radar systems.

Figure 3:
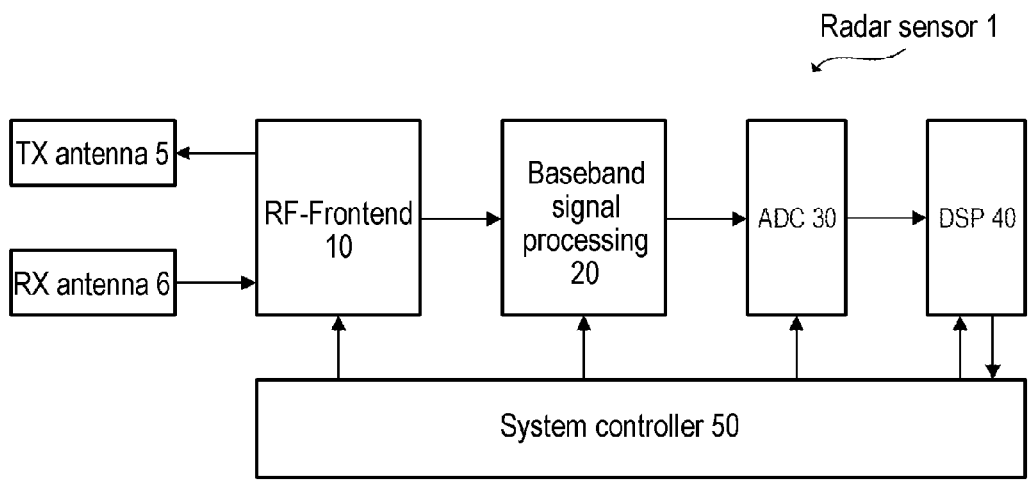
FIG. 3 is a block diagram for illustrating the fundamental structure of an FMCW radar system.

FIG. 3 is a block diagram which illustrates a simplified structure of a radar device 1 (radar sensor) by way of example. Accordingly, at least one transmitting antenna 5 (TX antenna) and at least one receiving antenna 6 (RX antenna) are connected to an RF frontend 10 which is integrated in a radar chip and which can include all those circuit components which are required for the RF signal processing. Said circuit components comprise for example a local oscillator (LO), RF power amplifiers, phase shifters, low-noise amplifiers (LNAs), directional couplers (e.g. Rat Race couplers, circulators, capacitive couplers, etc.) and mixers for down-converting the RF signals to baseband or an intermediate frequency band (IF band). The RF frontend 10 if appropriate together with further circuit components is integrated in the radar chip, which is also referred to as a monolithic microwave integrated circuit (MMIC).

The example illustrated shows a bistatic (or pseudo-monostatic) radar system comprising separate RX and TX antennas. In the case of a monostatic radar system, a single antenna would be used both for emitting and for receiving the electromagnetic (radar) signals. In this case, a directional coupler (e.g. a circulator) can be used to separate the RF signals to be emitted from the received RF signals (radar echoes). As mentioned, radar systems in practice usually comprise a plurality of transmitting and receiving channels having a plurality of transmitting and receiving antennas, respectively, which allows, inter alia, to measure the direction (DoA, direction of arrival) from which the radar echoes are received. This direction is usually represented by an angle (azimuth angle). In MIMO systems of this type, the individual TX channels and RX channels are usually constructed identically or similarly in each case. That is to say that the radar frontend 10 can have a multiplicity of transmitting and receiving channels, which can also be distributed among a plurality of radar chips.

In the case of a PMCW or FMCW radar system, the RF signals emitted via the TX antenna 5 can lie e.g. in the range of approximately 20 GHz to 100 GHz (e.g. around 77 GHz in some applications). The emitted RF signals are thus millimeter waves. As mentioned, the RF signal received by the RX antenna 6 comprises the radar echoes, i.e. those signal components which are backscattered at one or at a plurality of radar targets. The received RF signal $y_{RF}(t)$ is e.g. down-converted to baseband and processed further in baseband by means of analog signal processing (see FIG. 3, analog baseband signal processing chain 20). The analog signal processing mentioned substantially comprises filtering (e.g. high- and low-pass filters) and, if appropriate, amplification of the baseband signal. The baseband signal is finally digitized (see FIG. 3, analog-to-digital converter 30) and processed further in the digital domain. The digital signal processing chain can be implemented at least partly by means of software which can be executed on a processor, for example. Additionally, or alternatively, the digital signal processing chain can also include hardwired computing units. Expressed in a general way, the digital baseband signal processing is carried out by a computing unit 40 that can contain hardwired digital computing circuits and one-time programmable (OTP) digital computing circuits and also one or more processors (for example a microcontroller or a digital signal processor) that execute software instructions. Accordingly, a computing unit is understood to mean any circuit or group of circuits that is able to carry out the functions and calculations described here. A wide variety of suitable implementations of computing units are sufficiently known to the person skilled in the art and are therefore not discussed in greater detail here.

The overall system is generally controlled by means of a system controller 50, which can likewise be implemented at least partly by means of software which can be executed on a processor such as e.g. a microcontroller. The RF frontend 10 and the analog baseband signal processing chain 20 (and optionally also the analog-to-digital converter 30 and parts of the digital signal processing) can be jointly integrated in a single MMIC (i.e. an RF semiconductor chip). Alternatively, the individual components can also be distributed among a plurality of integrated circuits. The computing unit 40 can also be integrated together with the system controller 50 in one chip, although this is not necessarily the case.

Figure 4:
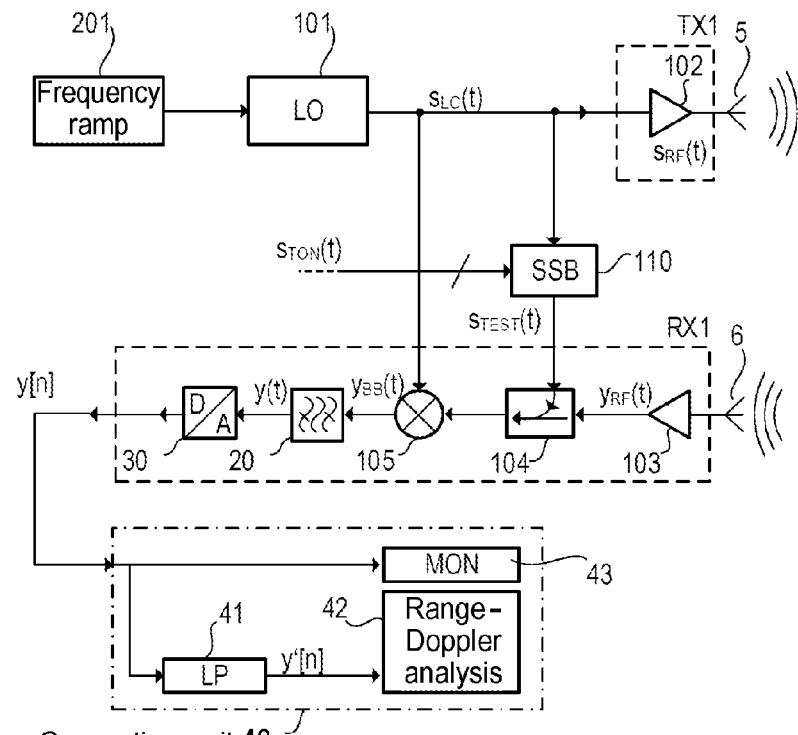
FIG. 4 is a block diagram for illustrating an example of an RF frontend of a radar system (transmitting and receiving channels) with baseband signal processing.

FIG. 4 illustrates an exemplary implementation of the RF frontend 10 with baseband signal processing chain 20 connected downstream, which can be part of the radar sensor from FIG. 3. Furthermore, the exemplary embodiment from FIG. 4 contains circuit components which allow to test the receiving channel, which components are explained in even greater detail later. It should be noted at this juncture that FIG. 4 is a simplified circuit diagram in order to show the fundamental structure of the RF frontend 10 with one transmitting channel (TX channel TX1) and one receiving channel (RX channel RX1). Actual implementations, which may depend greatly on the specific application, can be more complex, of course, and generally comprise a plurality of TX and/or RX channels. Furthermore, FIG. 4 shows only those components of the receiving channel RX1 and of the transmitting channel TX1 which are necessary for the following discussion of the exemplary embodiments. It is to be noted that actual implementations are more complex and comprise further circuit components (e.g. couplers, RF power sensors, phase shifters, etc.).

The RF frontend 10 comprises a local oscillator 101 (LO), which generates an RF oscillator signal $s_{LO}(t)$, or a terminal for receiving the RF oscillator signal $s_{LO}(t)$. The RF oscillator signal $s_{LO}(t)$, as described above with reference to FIG. 2, can be frequency-modulated and is also referred to as LO signal. In radar applications, the LO signal usually lies in the SHF (Super High Frequency, centimeter-wave) or in the EHF (Extremely High Frequency, millimeter-wave) band, e.g. in the interval of 76 GHz to 81 GHz or in the 24 GHz ISM band (Industrial, Scientific and Medical Band) in some automotive applications. It is to be noted that other frequency bands can also be used. The frequency of the local oscillator 101 is controlled by a circuit 201, usually referred to as a ramp generator. The ramp generator 201 defines start and stop frequencies, ramp duration, pause between the ramps and also start time and number of ramps of a sequence. The ramp generator 201 can be controlled by the system controller 50 (see FIG. 3).

The LO signal $s_{LO}(t)$ is processed both in the transmission signal path (in the TX channel TX1) and in the reception signal path (in the RX channel RX1). The transmission signal $s_{RF}(t)$ (cf. FIG. 2), emitted by the TX antenna 5, is generated by amplifying the LO signal $s_{LO}(t)$, for example by means of the RF power amplifier 102, and is thus merely an amplified version of the LO signal $s_{LO}(t)$. The output of the amplifier 102 can be coupled to the TX antenna 5 (in the case of a bistatic or pseudo-monostatic radar configuration). The transmission signal $s_{RF}(t)$ is thus the RF output signal of the transmitting channel TX1, which signal is output for example at a chip contact to which a transmitting antenna is connected.

The reception signal $y_{RF}(t)$ received by the RX antenna 6 is fed to the receiver circuit in the RX channel and thus directly or indirectly to the RF port of the mixer 104. In the present example, the RF reception signal $y_{RF}(t)$ (antenna signal) is preamplified by means of the amplifier 103 (gain g). The amplified antenna signal $g\, y_{RF}(t)$ is thus fed to the mixer 104. The amplifier 103 can be e.g. an LNA. The output of the amplifier 103 is coupled to an RF port of the mixer 105 via the coupler 104. That is to say that the amplified antenna signal $g\, y_{RF}(t)$ is fed to the RF port of the mixer 105. The LO signal $s_{LO}(t)$ is fed to the reference port of the mixer 105, such that the mixer 105 down-converts the (preamplified) antenna signal $y_{RF}(t)$ to baseband. The down-converted baseband signal (mixer output signal) is designated by $y_{BB}(t)$. Said baseband signal $y_{BB}(t)$ is firstly processed further in analog fashion, wherein the analog baseband signal processing chain 20 substantially brings about amplification and filtering (e.g. bandpass filter or a combination of high-pass filter and low-pass filter) in order to suppress undesired sidebands and image frequencies. The resulting analog output signal, which is fed to an analog-to-digital converter 30 (see also FIG. 3), is designated by y(t). The resulting digital signal at the output of the analog-to-digital converter 30 is designated as digital radar signal y[n]. The digital baseband signal processing by the computing unit 40 will be discussed later.

In the present example, the mixer 105 down-converts the preamplified RF reception signal $g\, y_{RF}(t)$ to baseband. The mixing can take place in one stage (that is to say from the RF band directly to baseband) or via one or more intermediate stages (that is to say from the RF band to an intermediate frequency band and further to baseband). In this case, the reception mixer 105 effectively comprises a plurality of individual mixer stages connected in series. In some radar systems, IQ demodulators are used as mixer in order to obtain an analytical baseband signal (having in-phase and quadrature components).

The computing unit 40 receives a data stream including the digital radar signal y[n] and contains a digital signal processing chain 41, which carries out filtering and decimation of the digital radar signal y[n]. In practice, oversampling takes place in the analog-to-digital converter 30, which has the advantage that a comparatively low filter order can be chosen for the anti-aliasing filter (low-pass filter) in the analog baseband signal processing chain 20. Steep-slope filtering with a comparatively high filter order takes place in the digital domain. For this purpose, the digital signal processing chain 41 can have a multi-rate filter that carries out filtering and decimation simultaneously. It is to be noted that filter and decimation can also be realized sequentially in different functional units. In FIG. 4, the decimated digital radar signal is designated by y'[n]. It is to be noted that the signals y[n] and 37'[n] include the same useful information. Therefore, for the sake of simplicity, a distinction is not always drawn between the digital radar signal y[n] and the decimated digital radar signal y'[n]. It may also be stated that y[n] and y'[n] denote different manifestations of the same signal.

As mentioned, in accordance with one or more exemplary embodiments, the analog-to-digital converter carries out oversampling. A sample rate at the output of the analog-to-digital converter 30 (input rate for the subsequent digital signal processing) of x samples per second (sampling frequency $f_S=x$), and a sample rate at the output of the digital signal processing chain 41 (output rate) of x/u samples per second (sampling frequency $f_{SO}=f_S/u$) means decimation by the factor u. The sampling frequency at the output also defines the Nyquist frequency $f_{NY}$ of the radar system, wherein $f_{NY}=f_{SO}/2$ holds true. The detection of radar targets can be carried out based on the (decimated) digital radar signal. Algorithms suitable for this are known to the person skilled in the art and are usually brought together under the term range-Doppler analysis. The latter comprises, inter alia, a two-dimensional Fourier transform (range FFT and Doppler FFT, where FFT denotes the known Fast Fourier Transform) and a threshold value detection. The detected (local) maxima represent position and speed of radar targets. Range-Doppler analysis and various concepts for detecting the relevant maxima are known per se and are therefore not discussed any further here.

As mentioned in the introduction, radar systems used e.g. in automobiles have to fulfil various standards relating to functional safety (e.g. ISO 26262). In order to ensure the functional safety of a radar sensor, it is important to know whether the current state of the radar sensor permits a reliable distance and speed measurement. To that end, tests can be carried out at regular intervals during the operation of the radar sensor, which tests are intended to ensure that the radar system is operating in accordance with desired specifications. By way of example, such self-tests of a radar system can be controlled by the system controller 50 (see FIG. 3) and be carried out between individual radar measurements. The exemplary embodiments described here even allow to carry out radar measurement and self-test simultaneously, such that theoretically a test result can be assigned to each individual measurement. The following explanations relate to a self-test function for testing the signal processing chain in a receiving channel, e.g. the RX channel RX1 illustrated in FIG. 4, the test encompassing all components from the mixer 105 to the analog-to-digital converter 30.

In order to carry out the test, an RF test signal $s_{TEST}(t)$ is coupled into the antenna signal path. That is to say that the RF test signal $s_{TEST}(t)$ is superposed on the (amplified or unamplified) antenna signal $y_{RF}(t)$. In the example illustrated in FIG. 4, the coupler 104 serves for coupling in the RF test signal $s_{TEST}(t)$, such that the mixer 105 "sees" a superposition of antenna signal $y_{RF}(t)$ and RF test signal $s_{TEST}(t)$ at its RF port. The position of amplifier 103 and coupler 104 as illustrated in FIG. 4 can also be interchanged.

The RF test signal $s_{TEST}(t)$ is generated by means of modulation of the LO signal $s_{LO}(t)$. For this purpose, the RF frontend 10 in FIG. 4 has a modulator 110, which modulates a test signal $s_{TON}(t)$ onto the LO signal $s_{LO}(t)$. In accordance with one exemplary embodiment, the modulator 110 is a single-sideband modulator and the test signal $s_{TON}(t)$ is a complex-valued signal having a single defined frequency $f_{TON}$. However, the test signal can also include a plurality of individual frequencies. In the present example with a complex test signal $s_{TON}(t)$, the real and imaginary parts thereof are often also referred to as in-phase and quadrature components. From a mathematical standpoint, the imaginary part of the test signal $s_{TON}(t)$ is the Hilbert transform of the real part, for which reason the test signal $s_{TON}(t)$ can also be referred to as an analytical signal having only positive or only negative frequencies. In the case where the complex test signal $s_{TON}(t)$ has only a single frequency $f_{TON}$ (which may also have negative values), the test signal $s_{TON}(t)$ can be defined as follows:

$$s_{TON}(t) = \alpha \cdot \exp(2\pi \cdot j \cdot f_{TON} \cdot t), \quad (1)$$

wherein j denotes the imaginary unit, exp(•) denotes the exponential function and a denotes the signal amplitude (t as usual denotes the time variable). It should be mentioned at this juncture that the LO signal $s_{LO}(t)$ itself may already have been modulated (frequency-modulated in the case of an FMCW radar). In this case, the modulator 110 modulates the frequency-modulated LO signal $s_{LO}(t)$ once again with the test signal $s_{TON}(t)$.

The mixer 105 mixes the superposition of antenna signal $y_{RF}(t)$ and RF test signal $s_{TEST}(t)$ into baseband. This has the consequence that (given a suitable choice of the frequency $f_{TON}$) the information that the test signal $s_{TON}(t)$ contains, namely the frequency $f_{TON}$ thereof and the amplitude ATON thereof, must also be contained in the digital radar signal y[n]. The actual monitoring of the receiving channel RX1 including analog-to-digital converter 30 takes place in the digital domain, namely in the monitoring unit 43, which can be implemented e.g. as a function block in the computing unit 40. That is to say that the monitoring unit 43 can be implemented by means of a processor that executes software instructions, or by means of hardwired computing circuits, by means of one-time programmable computing circuits or by means of a combination thereof. The monitoring unit 43 can be configured to calculate a spectral line A* (i.e. the complex amplitude) at the frequency $f_{TON}$ in the digital radar signal y[n], wherein both the absolute value A=|A*| and the phase $\phi = \text{artan}(\Im(A^*)/\Re(A^*))$ of the spectral line and also the variation of absolute value A and phase $\phi$ can subsequently be evaluated. It is to be noted that absolute value and phase cannot be explicitly calculated for this purpose. A monitoring of real part $\Re(A^*)$ and imaginary part $\Im(A^*)$ of the spectral line A* also corresponds de facto to a monitoring of absolute value and phase.

For a good monitoring of radar operation, it is desirable for the monitoring/evaluation of the test signal $s_{TON}(t)$ contained in the digital radar signal y[n] (see equation 1) also to be effected during the radar measurements. A radar measurement includes emitting a sequence of chirps (see FIG. 2) via one or more transmitting channels (e.g. transmitting channel TX1), receiving the digital radar signal y[n] with a corresponding sequence of signal segments (wherein each signal segment can be assigned to a chirp) and evaluating the sequence of signal segments, for example by means of range-Doppler analysis (Range FFT, Doppler FFT, also angle FFT in the case of MIMO systems), in order to detect radar echoes contained in the digital radar signal y[n]. As already mentioned further above, the RF test signal $s_{TEST}(t)$ generated based on the (e.g. analytical) test signal $s_{TON}(t)$ is superposed on the (optionally pre-amplified) antenna signal $y_{RF}(t)$ (see FIG. 4, mixer 105), for which reason the antenna signal $y_{RF}(t)$ and the RF test signal $s_{TEST}(t)$ in the receiving channel can be processed simultaneously and also during a radar measurement.

As mentioned, the test signal $s_{TON}(t)$ is manifested in the digital radar signal y[n] as a spectral line A* at the frequency $f_{TON}$. Radar echoes are also manifested in the digital radar signal y[n] as spectral lines, the frequencies of which represent e.g. distance and speed of a radar target. In order that the spectral line A* of the test signal cannot disturb real radar echoes, and in order to enable radar measurements and monitoring of the test signal to be carried out in parallel/simultaneously, the frequency $f_{TON}$ is chosen such that it lies in a transition band of the digital signal processing chain, while the radar echoes lie in a pass band. As mentioned, the transfer function of the digital signal processing chain 41 may have a low-pass filter characteristic, and a low-pass filter characteristic generally has the pass band, the transition band and a stop band. The boundary between the pass band and the transition band is usually referred to as cut-off frequency $f_C$. The cut-off frequency $f_C$ is usually defined as that frequency at which the gain is −3 dB, while in the pass band the gain is ideally 0 dB. Depending on the implementation of the low-pass filter, the gain in the pass band is approximately 0 dB and falls continuously to −3 dB as frequencies increase (i.e. as the distance to the cut-off frequency $f_C$ decreases). The gain decreases further in the transition band. The frequency at which the gain is so small (e.g. −100 dB), that the resulting output signals begin to disappear in the noise floor (e.g. at a signal/noise ratio SNR of −20 dB) can be referred to as the boundary between transition band and stop band.

Figure 5:
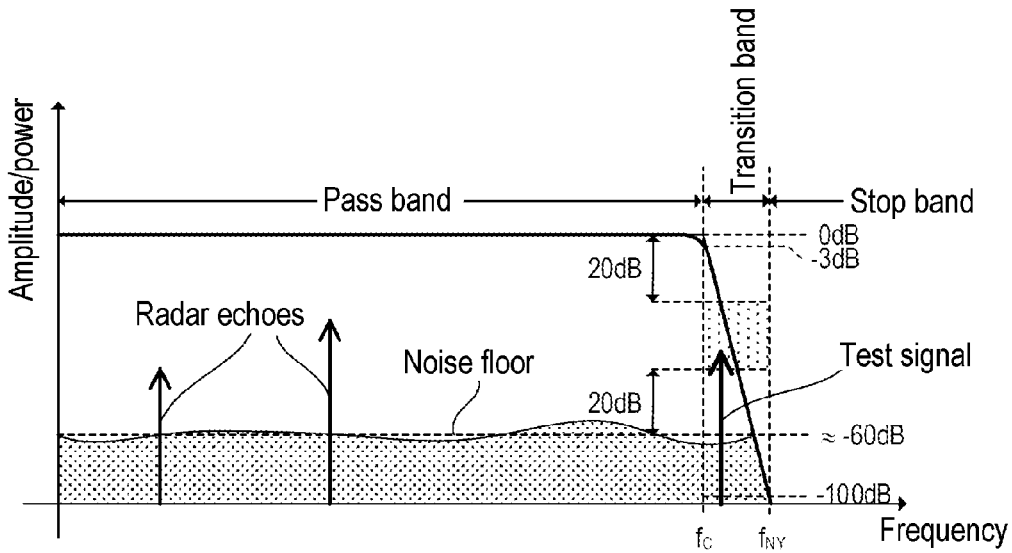
FIG. 5 is a diagram for schematically illustrating the spectrum of a received radar signal and a test signal.

The substantive matter described above is visualized based on an example in FIG. 5. FIG. 5 illustrates an example of a frequency response of the digital signal processing chain 41. As mentioned, the digital signal processing chain 41 has a low-pass filter characteristic, having a pass band (frequencies between 0 and $f_C$), a transition band and a stop band, wherein, in the example illustrated, the low-pass filter characteristic was designed such that the Nyquist frequency $f_{NY}$ is equal to the boundary between transition band and stop band, which need not necessarily be the case. Frequencies above the Nyquist frequency $f_{NY}$ always lie in the stop band in the examples described here. As mentioned, the Nyquist frequency $f_{NY}$ is equal to half the sampling frequency $f_{SO}$ at the output of the digital signal processing chain 41 (filtered digital radar signal y'[n]).

As illustrated in FIG. 5, the frequency $f_{TON}$ lies in the transition band, i.e. above the cut-off frequency $f_C$, but below the Nyquist frequency $f_{NY}$. In the examples described here, the amplitude or the power of the test signal $s_{TON}(t)$ is chosen such that the level of the corresponding spectral line A* is around 20 dB or more above the noise floor, but also around 20 dB or more below a maximum level, designated by 0 dB in the example from FIG. 5. The noise floor lies at approximately −60 dB in the example from FIG. 5, but in practice this is greatly dependent on the actual implementation. In one exemplary embodiment, the maximum level is at around −40 dBm and the noise floor is at around −100 dBm. In this example, the level of the test signal $s_{TON}(t)$ would be in the range of −80 dBm to −60 dBm. The desired range of the spectral line A* is shaded gray in FIG. 5. Possible radar targets are likewise represented in FIG. 5 and lie in the pass band. The cut-off frequency $f_C$ is at least 80% of the Nyquist frequency $f_{NY}$ in some exemplary embodiments, and 90% of the Nyquist frequency $f_{NY}$, e.g. around 95% of the Nyquist frequency, in other exemplary embodiments.

The monitoring unit 43 (see FIG. 4) evaluates the digital radar signal y[n] in the transition band in order to determine parameters of the test signal $s_{TON}(t)$ contained in the digital radar signal y[n]. For this purpose, the unfiltered radar signal y[n] can be fed to the monitoring unit 43, whereas the range-Doppler analysis is carried out based on the filtered (and decimated) radar signal y'[n], which then only contains signal components in the pass band. In order to determine absolute value A and phase (I) of the spectral line A* representing the test signal $s_{TON}(t)$, the monitoring unit 43 can carry out a Fourier transformation, for example, but other algorithms are also known, such as e.g. the Goertzel algorithm.

Figure 6:
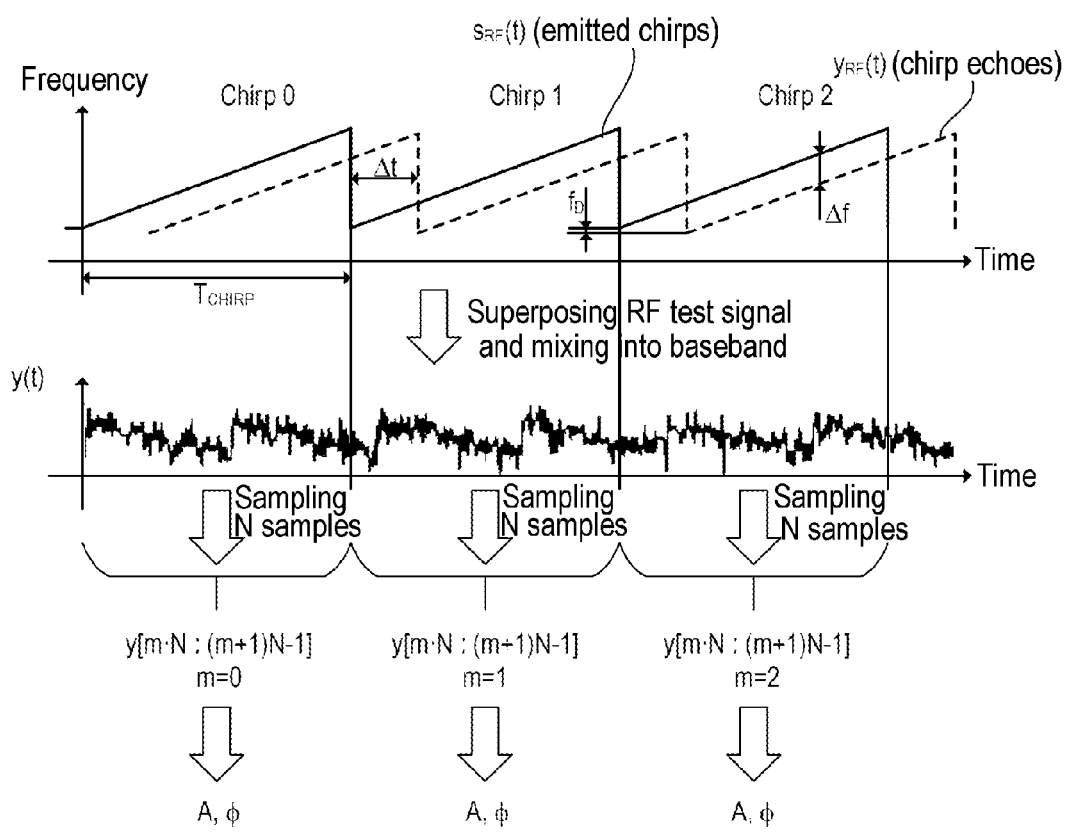
FIG. 6 schematically illustrates a method for carrying out a self-test by means of a test signal during a radar measurement.

FIG. 6 schematically visualizes an exemplary embodiment of a method for carrying out a self-test in a radar system by means of a test signal during a radar measurement. The method comprises generating an RF test signal $s_{TEST}(t)$ by means of modulating the LO signal $s_{LO}(t)$ with an (e.g. analytical) test signal $s_{TON}(t)$ (cf. FIG. 4, modulator 110). The method further comprises generating an RF output signal $s_{RF}(t)$ based on the LO signal $s_{LO}(t)$ and outputting the RF output signal $s_{RF}(t)$ at the output of a transmitting channel (cf. FIG. 4, transmitting channel TX1). The RF output signal $s_{RF}(t)$ comprises a multiplicity of chirp sequences, wherein each sequence is formed from a defined number of chirps (M chirps per sequence). The RF output signal $s_{RF}(t)$ emitted via a transmitting antenna may be backscattered at one or more radar targets, and the backscattered signal components are referred to as radar echoes. The latter are received by a receiving antenna. The method further comprises receiving an antenna signal $y_{RF}(t)$ (which contains the radar echoes) at the input of a receiving channel (cf. FIG. 4, receiving channel RX1). A radar echo is time-delayed relative to the RF output signal $s_{RF}(t)$ on account of the signal propagation time Δt (from the transmitting antenna to the radar target and back to the receiving antenna). This time delay Δt is illustrated in FIG. 6 and results in a frequency offset Δf, also referred to as beat frequency. The abovementioned RF test signal $s_{TEST}(t)$ is superposed on the antenna signal $y_{RF}(t)$ and the superposition of $y_{RF}(t)$ and $s_{TEST}(t)$ is down-converted to baseband (cf. FIG. 4, coupler 104 and mixer 105).

The method further comprises generating a digital radar signal y[n] based on the baseband signal. That is to say that the resulting baseband signal is digitized—optionally after analog preprocessing. The resulting digital radar signal y[n] contains the abovementioned beat frequencies caused by radar targets and the frequency $f_{TON}$ of the test signal $s_{TON}(t)$.

As illustrated in FIG. 6, the digital radar signal y[n] comprises a plurality of sequences, wherein each sequence includes M signal segments, each of which can be assigned to a specific chirp. Each signal segment comprises (optionally after a decimation as described above) a specific number of samples. In the illustration in FIG. 6, each segment has N samples (sample 0 to N−1 forms segment 0, sample N to 2N−1 forms segment 1, sample 2N to 3N−1 forms segment 2, etc.). The m-th signal segment can generally be written as y[m·N:(m+1)N−1] (cf. FIG. 6).

The digital processing of the digital radar signal y[n] comprises a digital signal processing chain with a digital filtering. The digital filter has a filter characteristic having a pass band, a transition band and a stop band. In this case, the frequency $f_{TON}$ of the test signal $s_{TON}(t)$ lies in the transition band. The radar echoes (i.e. the beat frequencies caused by radar targets) lie in the pass band and are therefore not influenced by the test signal.

The digital processing of the digital radar signal y[n] comprises an evaluation in a frequency range of the transition band in order to check whether the receiving channel RX1 (and the circuit components contained therein) is operating in accordance with a given specification. This evaluation can be effected in parallel with the detection of radar targets (range-Doppler analysis) that takes place in a frequency range of the pass band. In one exemplary embodiment, the check as to whether the receiving channel RX1 is operating in accordance with a given specification can be effected based on the unfiltered digital radar signal (cf. FIG. 4), whereas the range-Doppler analysis is effected based on the filtered digital radar signal. The digital signal processing chain can also contain a decimator. In one specific implementation, the digital filter is a decimation filter. As mentioned above, a Nyquist frequency $f_{NY}$ can be assigned to the output rate $f_{SO}$ of the digital signal processing chain. The cut-off frequency $f_C$ of the digital filter defining the boundary between pass band and transition band can be 0.8 times the Nyquist frequency $f_{NY}$ or higher. It lies in the range of $0.9 \cdot f_{NY}$ to $0.95 \cdot f_{NY}$, for example. The frequency of the test signal $s_{TON}$ lies above this frequency.

What is claimed is:
1. A radar system, comprising:
a signal generator configured to generate an RF signal;
a modulator configured to generate an RF test signal by modulating the RF signal with a test signal;
a transmitting channel configured to generate an RF output signal based on the RF signal;
a receiving channel configured to receive an antenna signal and the RF test signal and to down-convert a superposition of the antenna signal and the RF test signal to baseband by means of a mixer in order to obtain a baseband signal;
an analog-to-digital converter configured to generate a digital radar signal based on the baseband signal; and at least one processor configured to:
  filter the digital radar signal by means of a digital filter,
    wherein a filter characteristic of the digital filter has a pass band, a transition band, and a stop band,
    wherein the test signal has a frequency that lies in the transition band, and
    wherein the digital radar signal in the pass band is not influenced by the test signal;
  evaluate the digital radar signal in the transition band in order to check whether the receiving channel is operating in accordance with a given specification; and
  evaluate the digital radar signal in the pass band in order to detect one or more radar targets.

2. The radar system as claimed in claim 1, wherein the at least one processor is configured to:
  receive the digital radar signal as an unfiltered digital radar signal, and
  evaluate the unfiltered digital radar signal in the transition band.

3. The radar system as claimed in claim 1, wherein the at least one processor is configured to evaluate the digital radar signal in the pass band in parallel with evaluating the digital radar signal in the transition band.

4. The radar system as claimed in claim 1, wherein the modulator is configured to carry out a single-sideband modulation.

5. The radar system as claimed in claim 1, wherein the test signal is an analytical signal.

6. The radar system as claimed in claim 1, wherein the receiving channel includes a coupler having a first input for receiving the antenna signal, a second input for receiving the RF test signal, and an output coupled to an RF input of the mixer.

7. The radar system as claimed in claim 1, wherein the modulator is configured to generate the test signal such that a resulting test signal contained in the digital radar signal has a signal power that lies at least 20 dB above a power of a noise floor and at least 20 dB below a specified maximum power of the digital radar signal.

8. The radar system as claimed in claim 1, further comprising:
  an analog baseband signal processing chain configured to preprocess the baseband signal before the analog-to-digital converter,
    wherein the analog baseband signal processing chain comprises an analog low-pass filter, and
    wherein the test signal has a frequency that is higher than a cut-off frequency of the digital filter and lower than a cut-off frequency of the analog low-pass filter.

9. The radar system as claimed in claim 1, further comprising:
  a digital signal processing chain comprising the digital filter and configured to process the digital radar signal in a frequency range comprising the pass band and the transition band.

10. The radar system as claimed in claim 9, wherein the digital signal processing chain further comprises a decimator configured to reduce a sample rate of the digital radar signal from an input rate to an output rate,
  wherein a Nyquist frequency is assignable to the output rate, and
  wherein the Nyquist frequency approximately forms a boundary between the transition band and the stop band.

11. The radar system as claimed in claim 10, wherein the analog-to-digital converter is configured to carry out an oversampling with respect to the Nyquist frequency.

12. A method, comprising:
  generating an RF signal by means of a signal generator;
  generating an RF test signal by modulating the RF signal with a test signal;
  generating an RF output signal based on the RF signal and outputting the RF output signal at the output of a transmitting channel;
  receiving an antenna signal at an input of a receiving channel;
  down-converting a superposition of the antenna signal and the RF test signal to baseband by means of a mixer in order to obtain a baseband signal;
  generating a digital radar signal based on the baseband signal;
  digital processing of the digital radar signal,
    wherein the digital processing comprises digital filtering with a filter characteristic that has a pass band, a transition band, and a stop band,
    wherein the test signal has a frequency that lies in the transition band, and
    wherein the digital radar signal in the pass band is not influenced by the test signal;
  evaluating the digital radar signal in the transition band in order to check whether the receiving channel is operating in accordance with a given specification; and
  evaluating the digital radar signal in the pass band in order to detect one or more radar targets.

13. The method as claimed in claim 12, wherein the digital processing of the digital radar signal comprises:
  evaluating the digital radar signal, as unfiltered, in the transition band.

14. The method as claimed in claim 12, wherein the antenna signal contains one or more echoes of the RF output signal, and
  wherein a detection of one or more radar targets is performed in parallel with checking as to whether the receiving channel is operating in accordance with the given specification.

15. A radar system, comprising:
  a modulator configured to generate an RF test signal by modulating an RF signal with a test signal;
  a transmitting channel configured to generate an RF output signal based on the RF signal;
  a receiving channel configured to:
    receive an antenna signal and the RF test signal; and
    obtain a baseband signal based on down-converting a superposition of the antenna signal and the RF test signal to a baseband;
  an analog-to-digital converter configured to generate a digital radar signal based on the baseband signal; and
  at least one processor configured to:
    filter the digital radar signal by means of a digital filter,
      wherein a filter characteristic of the digital filter has a pass band, a transition band, and a stop band,
      wherein the test signal has a frequency that lies in the transition band, and
      wherein the digital radar signal in the pass band is not influenced by the test signal;
    evaluate the digital radar signal in the transition band in order to check whether the receiving channel is operating in accordance with a given specification; and
    evaluate the digital radar signal in the pass band in order to detect one or more radar targets.

16. The radar system as claimed in claim 15, wherein the at least one processor is configured to:
   receive the digital radar signal as an unfiltered digital radar signal, and
   evaluate the unfiltered digital radar signal in the transition band.

17. The radar system as claimed in claim 15, wherein the modulator is configured to generate the test signal such that a resulting test signal contained in the digital radar signal has a signal power that lies at least 20 dB above a power of a noise floor and at least 20 dB below a specified maximum power of the digital radar signal.

18. A radar system, comprising:
   at least one processor configured to:
      filter a digital radar signal by means of a digital filter, wherein a filter characteristic of the digital filter has a pass band, a transition band, and a stop band,
      wherein a test signal has a frequency that lies in the transition band, and
      wherein the digital radar signal in the pass band is not influenced by the test signal;
      evaluate the digital radar signal in the transition band to determine whether a receiving channel of the radar system is operating in accordance with a given specification; and
      evaluate, in parallel with evaluating the digital radar signal in the transition band, the digital radar signal in the pass band to detect one or more radar targets.

19. The radar system as claimed in claim 18, wherein the at least one processor is further configured to:
   receive the digital radar signal as an unfiltered digital radar signal, and
   evaluate the unfiltered digital radar signal in the transition band.

20. The radar system as claimed in claim 18, further comprising:
   a digital signal processing chain comprising the digital filter and configured to process the digital radar signal in a frequency range comprising the pass band and the transition band.

* * * * *